C. BYRNE.
TIRE REPAIRING CASE.
APPLICATION FILED APR. 16, 1908.

1,040,878.

Patented Oct. 8, 1912.

WITNESSES

INVENTOR
Charles Byrne,
BY
Alfred Ischinkel.
ATTORNEY

UNITED STATES PATENT OFFICE.

CHARLES BYRNE, OF POMPTON LAKES, NEW JERSEY.

TIRE-REPAIRING CASE.

1,040,878.      Specification of Letters Patent.      Patented Oct. 8, 1912.

Application filed April 16, 1908. Serial No. 427,556.

*To all whom it may concern:*

Be it known that I, CHARLES BYRNE, a citizen of the United States, residing at Pompton Lakes, county of Passaic, and State of New Jersey, have invented a new and useful Improvement in Tire-Repairing Cases, of which the following is a specification.

My invention relates to improvements in pneumatic tire repairing cases and has for its object to provide a case with means for fastening a tire to the cover of said case to facilitate the repairing of same and the object of my invention is to provide a case with means for quick repairing of a punctured or otherwise damaged tire. I attain this object by the mechanism illustrated in the accompanying drawings in which:—

Figure 1:
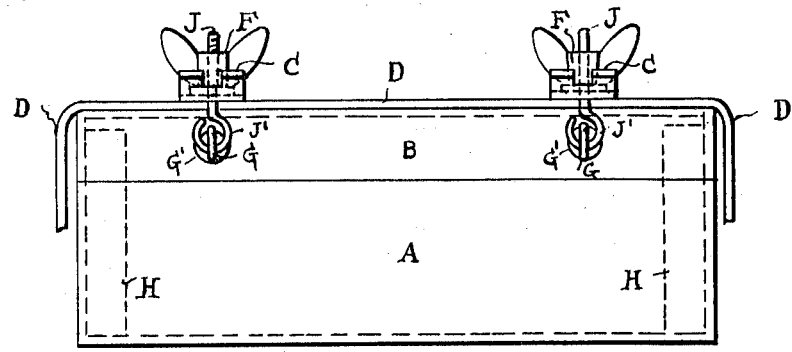
Figure 2:
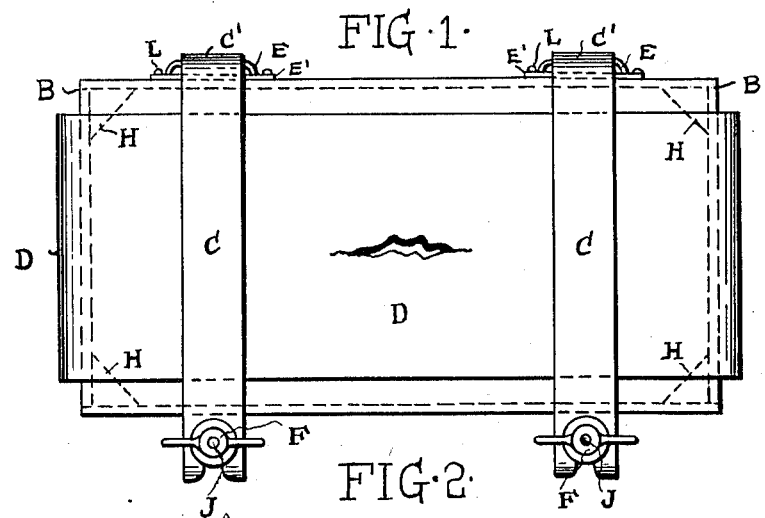
Figure 3:
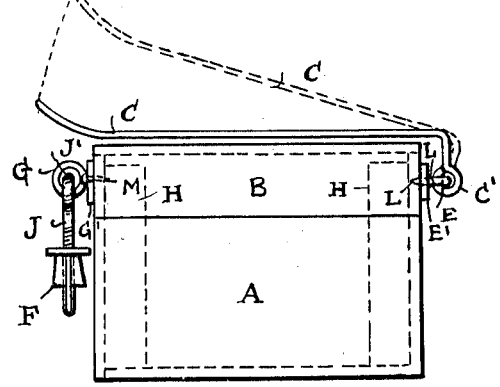

Figure 1 is a front view of a case, showing the damaged portion of a tire fastened to the cover or lid of same. Fig. 2 is a top view of the case. Fig. 3 is a side view of the repairing case, showing arms hinged to the cover and lockscrews with their heads movably secured to rings, fastened to said cover.

Similar letters refer to similar parts throughout the several views.

A case body A is provided with triangular corner studs H, to prevent the cover B from slipping off said case body A. Arms C bent at one end C' and movably connected to a rod E, having both ends bent and secured to a flange E', being fastened to the outer rear face of the cover B of the case A, by means of screws or nails L. Said arms C extend across the outer face of said cover, the extending portions being notched lengthwise to support a winged head F of a lockscrew J ending in a ring J', movably secured to a ring G, having a flange G', secured to one side of the cover B, by means of screws M.

A case body A is supplied with rubber cement patches and other like material necessary for repairing of a punctured or otherwise damaged tire. The cover B of said case body A is provided with means to fasten the damaged tire portion to its outer face, facilitating patching or other repairing of the same. I prefer to carry out this feature of my invention in the manner shown in Figs. 1 and 2, where it will be seen, that arms C hinged to one side of the cover B, extend across the outer face of same. The case body A is carrying lockscrews J and their heads F, forming a part of the tire fastening device and hold the damaged tire portion in position to be operated on. The lockscrews J and their heads F furnish means for a tight securing of the damaged tire portion to the outer face of said cover B and facilitate operating on.

What I do claim as my invention and desire to secure by Letters Patent is:—

1. In a tire repairing case the combination of a case body with a cover, arms extending across the upper face of said cover, having one end hinged to one side of said cover, the other end being notched lengthwise to support a locking screw, having a nut movably secured to the ring shaped head of a bolt secured to the front of said case, substantially as described.

2. In a tire repairing case the combination of a case body having triangular studs with a cover, prevented by said studs from slipping off sidewise, the cover having arms hinged at one side, extending across its upper face, the face ends of said arms notched lengthwise to support locking screws bearing nuts movably secured to ring shaped heads of bolts secured to the front of said case, substantially as set forth.

In testimony whereof, I have signed my name to this specification in the presence of two subscribing witnesses, this 13th day of April, 1908.

CHARLES BYRNE.

Witnesses:
     M. J. H. FERRIS,
     ELEANOR M. HEESE.

Copies of this patent may be obtained for five cents each, by addressing the "Commissioner of Patents, Washington, D. C."